J. E. NEWCOMB.
HAME-FASTENER.
No. 174,146. Patented Feb. 29, 1876.
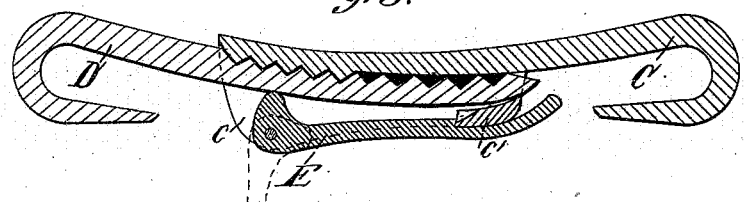
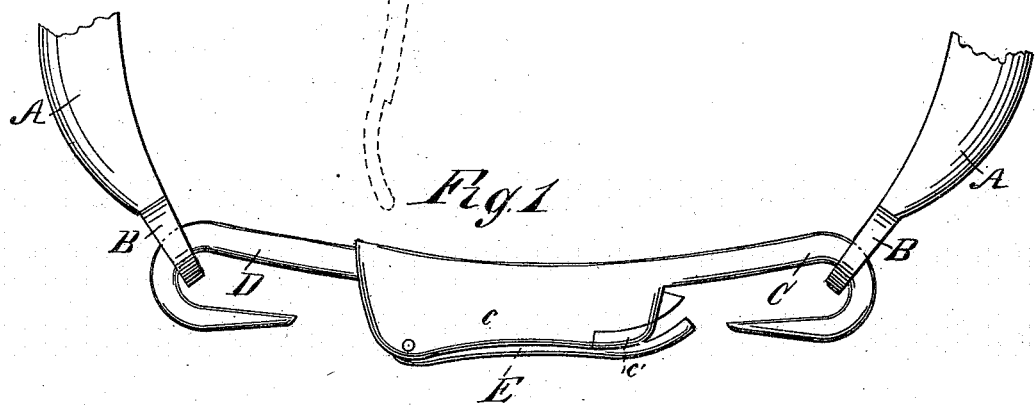

UNITED STATES PATENT OFFICE.

JAMES E. NEWCOMB, OF MUSCATINE, IOWA, ASSIGNOR OF ONE-HALF HIS RIGHT TO JAMES M. WIER, OF SAME PLACE.

IMPROVEMENT IN HAME-FASTENERS.

Specification forming part of Letters Patent No. 174,146, dated February 29, 1876; application filed February 2, 1876.

*To all whom it may concern:*

Be it known that I, JAMES E. NEWCOMB, of Muscatine, county of Muscatine and State of Iowa, have invented certain new and useful Improvements in Hame-Fasteners, of which the following is a full, clear, and exact description, such as will enable others skilled in the art to which it pertains to make and use the same, reference being had to the accompanying drawing, in which—

Figure 1 is a side elevation of a pair of hames and of my device. Fig. 2 is a bottom-plan view of my device alone, and Fig. 3 is a sectional view of Fig. 2 on the plane of the line $x\ x$.

Referring to the parts by letters, letters A represent the two sides of a pair of hames, front view, and B B represent the ordinary hame-loops on their lower ends. C is a hook, its shank end extended, and provided with side flanges $c\ c$, stayed by a cross-piece, $c'$, at one of their ends. D is a hook, the shank end of which fits snugly between the jaws $c$, and the upper side of which is notched to correspond with the adjacent face of the shank of the hook C. E is a thumb-lever pivoted between the jaws $c$ at one end thereof, and its pivoted end formed into a cam, $e$.

By turning the lever E up to the position shown by dotted lines at Fig. 3, the hook D may be moved longitudinally at pleasure between the jaws $c$, and by turning the same lever down to the position shown by full lines it may be locked in any desired position, and thus used to tighten or loosen the hames at pleasure, the hooks being engaged in the loops B.

I claim—

The hook C, having jaws $c$, connected by a cross-piece, $c'$, and notched shank, arranged to operate with the similarly-notched shank-hook D, by pressure together, by means of a cam, E $e$, substantially as and for the purpose specified.

JAMES E. NEWCOMB.

Witnesses:
 THOS. MCKEE,
 C. M. HALL.